(12) United States Patent
Zeissner et al.

(10) Patent No.: US 9,964,172 B2
(45) Date of Patent: May 8, 2018

(54) ADJUSTABLE DAMPING VALVE DEVICE

(71) Applicant: ZF FRIEDRICHSHAFEN AG, Friedrichshafen (DE)

(72) Inventors: Bernd Zeissner, Volkach (DE); Martin Hillenbrand, Kolitzheim (DE); Özcan Durukan, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days. days.

(21) Appl. No.: 15/302,452

(22) PCT Filed: Mar. 20, 2015

(86) PCT No.: PCT/EP2015/055903
§ 371 (c)(1),
(2) Date: Oct. 6, 2016

(87) PCT Pub. No.: WO2015/158495
PCT Pub. Date: Oct. 22, 2015

(65) Prior Publication Data
US 2017/0023087 A1 Jan. 26, 2017

(30) Foreign Application Priority Data
Apr. 17, 2014 (DE) .................. 10 2014 207 464

(51) Int. Cl.
*F16F 9/512* (2006.01)
*F16F 9/348* (2006.01)
*F16F 9/46* (2006.01)

(52) U.S. Cl.
CPC ............ *F16F 9/5126* (2013.01); *F16F 9/348* (2013.01); *F16F 9/3485* (2013.01); *F16F 9/46* (2013.01)

(58) Field of Classification Search
CPC ........ F16F 9/5126; F16F 9/348; F16F 9/3485; F16F 9/46
USPC ............................. 188/313, 322.15, 322.13
See application file for complete search history.

(56) References Cited

U.S. PATENT DOCUMENTS

| | | | |
|---|---|---|---|
| 5,398,787 A | 3/1995 | Woessner | |
| 5,811,756 A * | 9/1998 | Horita | B23K 9/0026 219/137 WM |
| 5,975,258 A | 11/1999 | Takashi | |
| 6,981,577 B2 * | 1/2006 | Katayama | F16F 9/537 188/267.1 |
| 7,946,399 B2 * | 5/2011 | Masamura | F16F 9/465 188/282.4 |

(Continued)

FOREIGN PATENT DOCUMENTS

| | | | |
|---|---|---|---|
| DE | 4022098 C1 * | 7/1991 | ............ F16F 9/3482 |
| DE | 4418972 | 12/1995 | |

(Continued)

*Primary Examiner* — Thomas J Williams
*Assistant Examiner* — Mariano Sy
(74) *Attorney, Agent, or Firm* — Cozen O'Connor

(57) ABSTRACT

An adjustable damping valve device includes a pressure-dependent auxiliary damping valve with an auxiliary damping valve body having at least one through-channel whose outlet side is at least partially covered by at least one valve disk. The at least one valve disk is centered at its outer diameter with respect to the auxiliary damping valve body, and the auxiliary damping valve body is constructed integral with a centering collar at which the at least one valve disk is guided.

5 Claims, 2 Drawing Sheets

(56) References Cited

U.S. PATENT DOCUMENTS

| | | | | |
|---|---|---|---|---|
| 8,978,844 B2* | 3/2015 | Heyn | ............... | F16F 9/34 188/266.5 |
| 9,297,437 B2* | 3/2016 | Forster | ............... | F16F 9/464 |
| 2004/0217559 A1* | 11/2004 | Schlitzkus | ............... | B60T 17/00 280/1 |
| 2013/0340865 A1* | 12/2013 | Manger | ............... | F16F 9/464 137/561 R |
| 2017/0152910 A1* | 6/2017 | Schaffelhofer | ............... | B60G 13/08 |

FOREIGN PATENT DOCUMENTS

| | | |
|---|---|---|
| DE | 19750155 | 5/1998 |
| DE | 102012210459 | 6/2012 |

* cited by examiner

ADJUSTABLE DAMPING VALVE DEVICE

PRIORITY CLAIM

This is a U.S. national stage of application No. PCT/EP2015/055903, filed on Mar. 20, 2015. Priority is claimed on the following application: Country: Germany, Application No.: 10 2014 207 464.9, Filed: Apr. 17, 2014; the content of which is incorporated herein in its entirety by reference.

FIELD OF THE INVENTION

The present invention is directed to a damping valve device having a pressure-dependent auxiliary damping valve and at least one valve disk that is centered at its outer diameter.

BACKGROUND OF THE INVENTION

An adjustable damping valve device known from US2013/0340865 has a pressure-dependent auxiliary damping valve which is connected in series upstream of an adjustable main stage valve. The auxiliary damping valve has a construction such as that used in bottom valves, known per se. A damping valve body has separate through-channels for the two throughflow directions which are at least partially covered on their outlet side in each instance by at least one valve disk. A central fastening bolt fixes the valve disks at their inner diameters.

At least one valve disk facing in the direction of the main stage valve is guided radially by a separate centering ring. An auxiliary damping valve body and the centering ring are radially and axially fixed in a tubular housing which is in turn fastened to a piston which is connected to an outer housing of the damping valve device via a connection sleeve.

The valve disk facing in direction of the main stage valve is preloaded by a valve spring supported at an annular cover. The serial arrangement of the auxiliary damping valve body and centering ring induces a summing of manufacturing tolerances which determine the axial installation space for the valve spring and accordingly the preloading or closing force. Ultimately, the damping force characteristic of the auxiliary damping valve is dependent on the closing force of the valve spring.

A further disadvantage of the construction principle consists in that the centering ring is radially supported at the tubular housing. Consequently, an inner wall of the tubular housing must be manufactured in a very precise manner because otherwise a leakage gap can occur under some circumstances between the tubular housing on the one hand and the auxiliary damping valve body and centering ring on the other hand.

It is thus an object of the present invention to overcome the manufacturing problem known from the prior art in connection with the auxiliary damping valve.

SUMMARY OF THE INVENTION

This object is met according to the present invention in that the auxiliary damping valve body is constructed integral with a centering collar at which the at least one valve disk is guided.

As a result of the integral construction of the centering collar, which exercises the function of the centering ring, and of the auxiliary damping valve body, the axial installation space can be made in a distinctly more precise manner. For example, it is possible to produce the auxiliary damping valve body by sintering techniques so that a very high dimensional accuracy can be achieved even without chip-removing finishing machining.

In a further advantageous configuration, the centering collar of the auxiliary damping valve body has a front face on which an annular cover is supported, a valve spring which preloads the valve disk being supported at this annular cover. The centering ring of the prior art has a minimum wall thickness so that it can be handled in a dimensionally stable manner for the assembly process. The radial front face or support surface for the annular cover could turn out appreciably narrower. Because of the novel, integral mode of construction, the support surface for the annular cover can have a larger inner diameter so that a valve disk with a larger outer diameter is available and a larger radial installation space is available for the at least one flow cross section.

Further, it can be provided that a sleeve portion axially adjoining the centering collar forms a dividing piston between two working chambers which are formed in a cylinder of a vibration damper. In principle, the damping valve device can also be arranged externally at a receptacle of a vibration damper as is known, for example, from U.S. Pat. No. 5,398,787, the disclosure of which is hereby incorporated by reference in its entirety.

Appreciable axial installation space is gained when the damping valve device is arranged at an axially movable piston rod of a vibration damper as a result of this auxiliary function of the auxiliary damping valve. By direct comparison to the prior art, it can be seen that the previous installation space for the piston can be saved.

Advantageously, the auxiliary damping valve body is connected directly to a valve housing of the damping valve device. There is no expensive coupling point in contrast to the prior art.

It can be provided that the auxiliary damping valve body is connected to the valve housing via a threaded connection. This technology allows the damping valve device to be dismantled.

Alternatively, the auxiliary damping valve body can be connected to the valve housing via welding. This variant allows a quick assembly and prevents unauthorized disassembly of the damping valve device.

For this purpose, a front end face can have a weld bevel inclined in direction of the valve housing. The weld bevel further facilitates assembly of the valve parts on the auxiliary damping valve body.

BRIEF DESCRIPTION OF THE DRAWINGS

The invention will be described more fully referring to the drawings in which.

DETAILED DESCRIPTION OF THE PRESENTLY PREFERRED EMBODIMENTS

Figure 1:
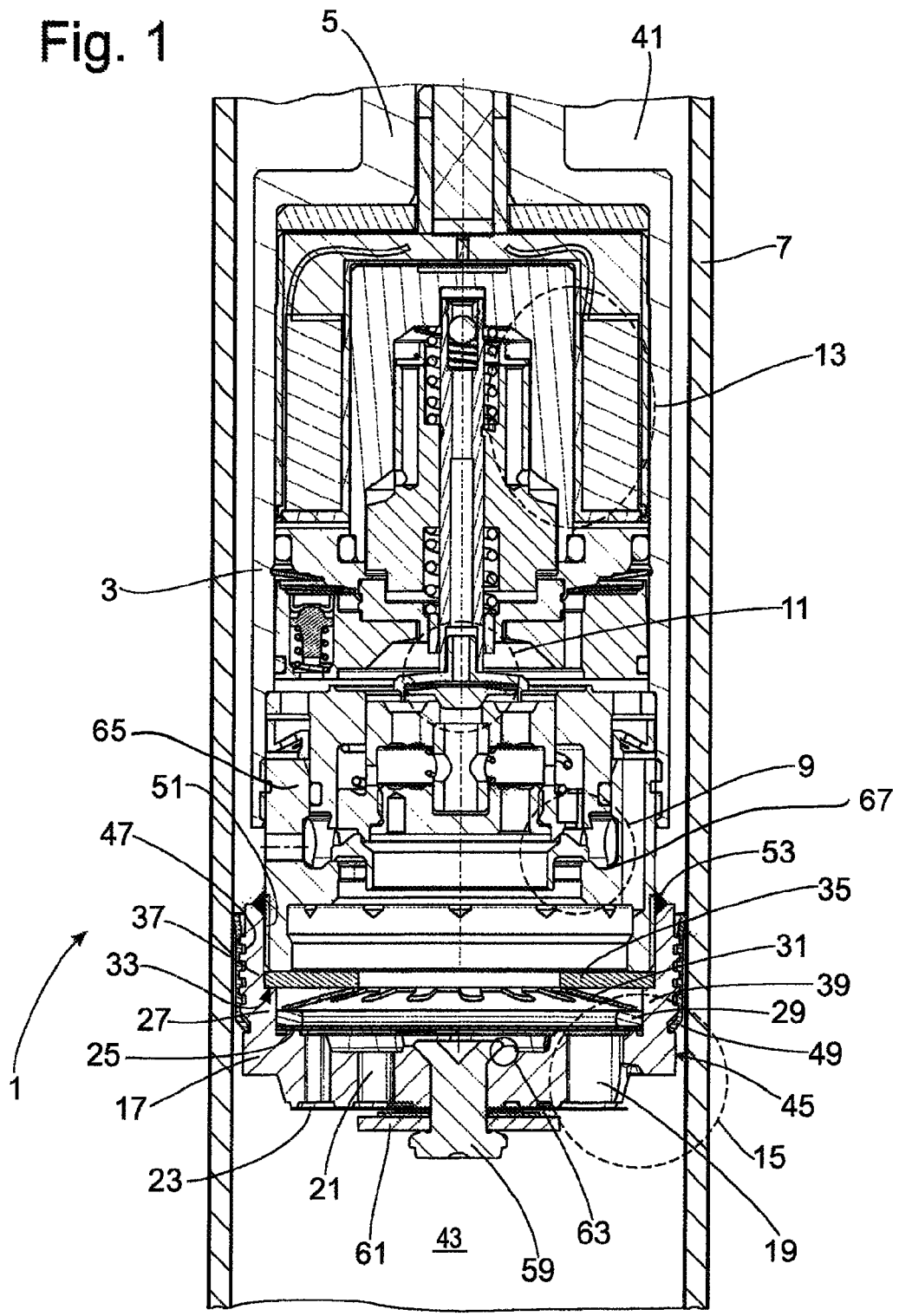
FIG. 1 is a sectional view of a damping valve device of the present invention.

FIG. 1 shows a damping valve device 1 in an outer valve housing 3 which is fastened to a piston rod 5. The piston rod 5 is axially movably guided in a cylinder 7 which is filled with a damping medium.

The damping valve device 1 comprises a main stage valve 9 which is controlled via a pre-stage valve 11. An actuator 13 is used to actuate the pre-stage valve 11. The exact construction of the pre-stage valve 11 and main stage valve 9 need not be described for purposes of the description of the present invention. As a substitute, reference is made to DE 10 2012 210 459 B3, US2013/0340865, the disclosure of which is hereby incorporated by reference in its entirety.

As shown in FIG. 1, the main stage valve 9 includes a connection sleeve 65 and a housing-side valve seat surface 67. Spatially and functionally in series with the main stage valve 9, the damping valve device 1 has a pressure-dependent auxiliary damping valve 15. The auxiliary damping valve 15 has an auxiliary damping valve body 17 having at least one through-channel 19; 21 per throughflow direction. The outlet side of the at least one through-channel 19; 21 is at least partially covered by at least one valve disk 23; 25. The at least one valve disk 25 is centered at its outer diameter with respect to the auxiliary damping valve body 17. By 'centered' is meant that the valve disk is constrained against radial displacement at its outer diameter by centering collar 27. To this end, the auxiliary damping valve body 17 is constructed integral with a centering collar 27 at which the at least one valve disk 25 is radially guided.

An adjusting ring 29 for a valve spring 31 is optionally arranged on the valve disk 25 which faces in direction of the main stage valve 9. The centering collar 27 of the auxiliary damping valve body 17 has a front face 33 on which an annular cover 35 is supported, the valve spring 31 preloading the valve disk 25 being supported at this annular cover 35. The constructional configuration of the valve spring 31 is known.

A sleeve portion 37 forming a dividing piston 39 between two working chambers 41; 43 of the cylinder 7 axially adjoins the centering collar 27. The dividing piston 39 is accordingly also constructed integral with the auxiliary damping valve body 17 and has at its outer lateral surface 45 a profile 47 for receiving a piston ring 49.

The auxiliary damping valve body 17 accordingly has a pot-like basic shape with a base in which the through-channels 19; 21 are formed and a stepped wall for the centering function of the valve disk 25, the supporting function of the annular cover 35 and the connecting function for connecting to the valve housing 3.

Figure 2:
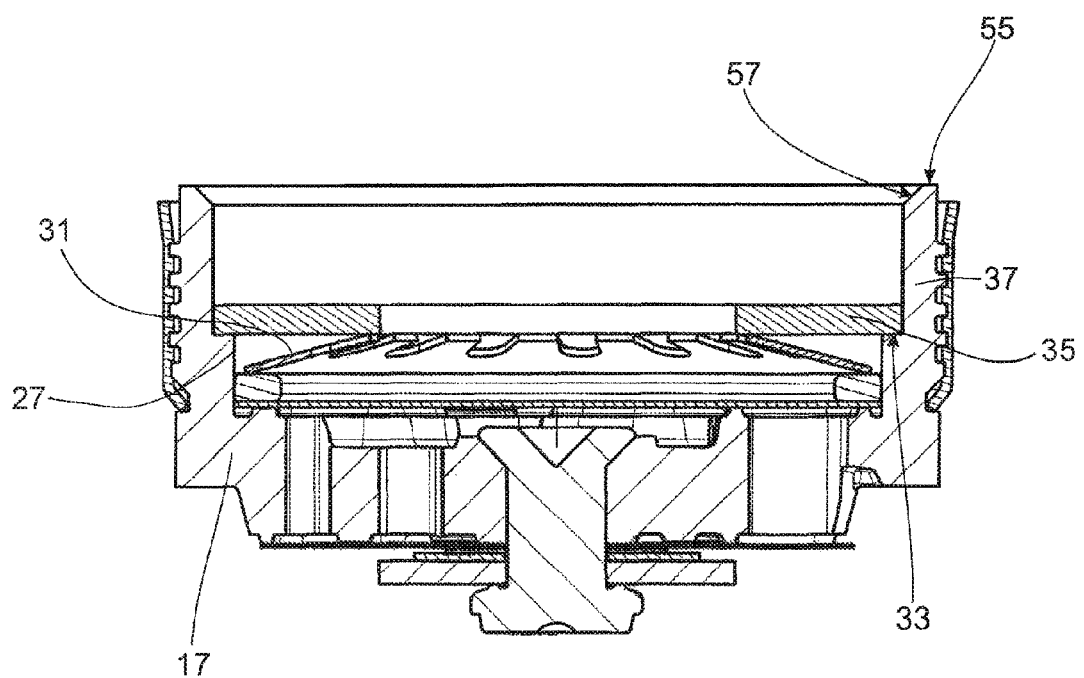
FIG. 2 is a sectional view of an auxiliary damping valve as individual part.

The auxiliary damping valve body 17 is connected directly, i.e., without additional intermediate sleeve, to the valve housing 3 of the damping valve device 1. The auxiliary damping valve body 17 is connected to the valve housing 3 via a threaded connection 51 or via a weld 53. To this end, a front end face 55 has a weld bevel 57 (FIG. 2) which is inclined in direction of the valve housing 3.

During assembly of the auxiliary damping valve 15, a supporting disk 61 and at least one valve disk 23 are threaded onto a central fastening bolt 59 in direction of the working chamber 43 remote of the piston rod. The fixing rivet is inserted into a central opening of the auxiliary damping valve body and secured axially via a positive engagement connection 63. In so doing, an axial load is possibly exerted on the fastening bolt 59 in order to preload the valve disk. If needed, the auxiliary damping valve 15 can be tested for flow in the direction of the working chamber 43 remote of the piston rod.

Subsequently, the at least one valve disk 25 facing in direction of the main stage valve 9 is inserted into the pot-shaped auxiliary damping valve body via the sleeve portion 37. The optional adjusting ring 29 and the valve spring 31 are then added. The annular cover 35 forms the functional termination of the auxiliary damping valve 15. Depending on assembly organization, the annular cover 35 can form a slight press fit with its outer wall in the inner wall of the sleeve portion 37 so that the damping valve forms a manageable unit. The piston rod 49 is then installed.

This constructional unit is screwed to the valve housing or welded to the valve housing in the region of the bevel 57.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable damping valve device (1) comprising:
at least one valve disk (23; 25);
a valve housing (3) including a main stage valve (9);
a pressure-dependent auxiliary damping valve (15) comprising a sleeve portion (37) and an auxiliary damping valve body (17) having at least one through-channel (19; 21) comprising an outlet side at least partially covered by said at least one valve disk (23; 25), said at least one valve disk (25) being centered at its outer diameter with respect to said auxiliary damping valve body (17), said sleeve portion (37) constructed to form a dividing piston (39) between a first and second working chamber (41, 43), said sleeve portion comprising an outer surface and a sealing ring (49) at said outer surface; a centering collar (27) for guiding said at least one valve disk (25), wherein said auxiliary damping valve body (17) is constructed as a single constructional unit with said sleeve portion (37) and said centering collar (27) so as to prevent leakage of damping fluid between said auxiliary damping valve body (17) and said sleeve portion (37); and
a connection sleeve (65) comprising a housing-side valve seat surface (67), said connection sleeve (65) indirectly connecting said valve housing (3) and said auxiliary damping valve (15).

2. The adjustable damping valve device according to claim 1, additionally comprising an annular cover (35) and a valve spring (31); and wherein said centering collar (27) of said auxiliary damping valve body (17) comprises a front face (33) on which said annular cover (35) is supported, said valve spring (31) preloading said valve disk (25) being supported at said annular cover (35).

3. The adjustable damping valve device according to claim 1, wherein said auxiliary damping valve body (17) is connected to said connection sleeve (65) via a threaded connection (51).

4. The adjustable damping valve device according to claim 1, wherein said auxiliary damping valve body (17) is connected to said connection sleeve (65) via a weld (53).

5. The adjustable damping valve device according to claim 4, wherein said auxiliary valve body comprises a front end face (55), and wherein said front end face (55) comprises a weld bevel (57) inclined in the direction of the valve housing (3).

\* \* \* \* \*